July 25, 1933.　　　　　G. N. DUNHAM　　　　　1,919,275
PHOTOPRINT DRIER
Filed Jan. 16, 1932　　　2 Sheets-Sheet 1
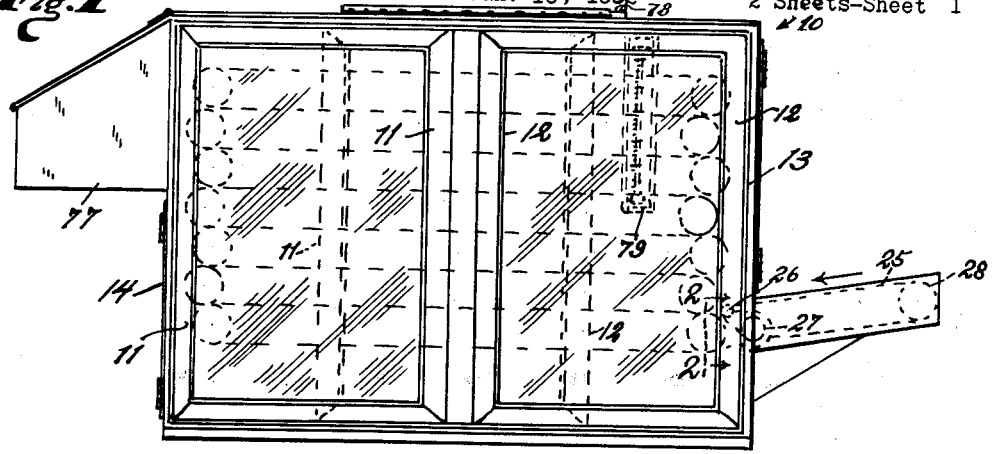
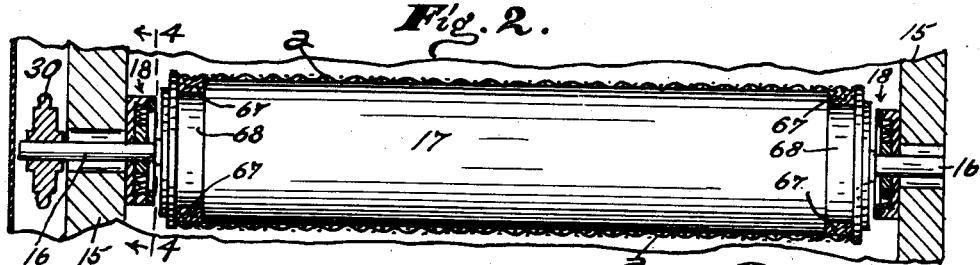
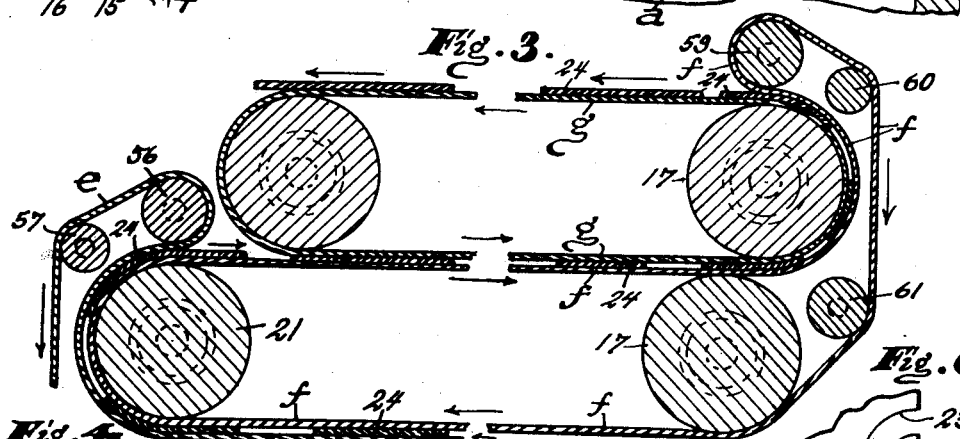
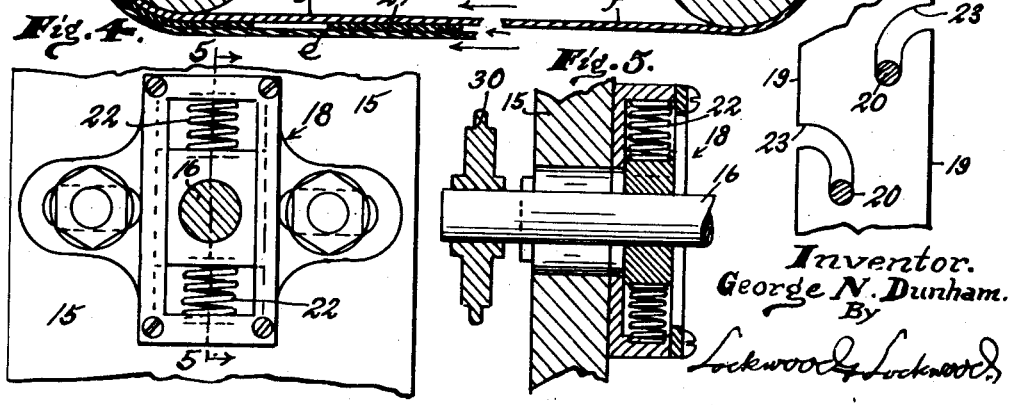
Inventor.
George N. Dunham.
By
Lockwood & Lockwood
His Attorneys.

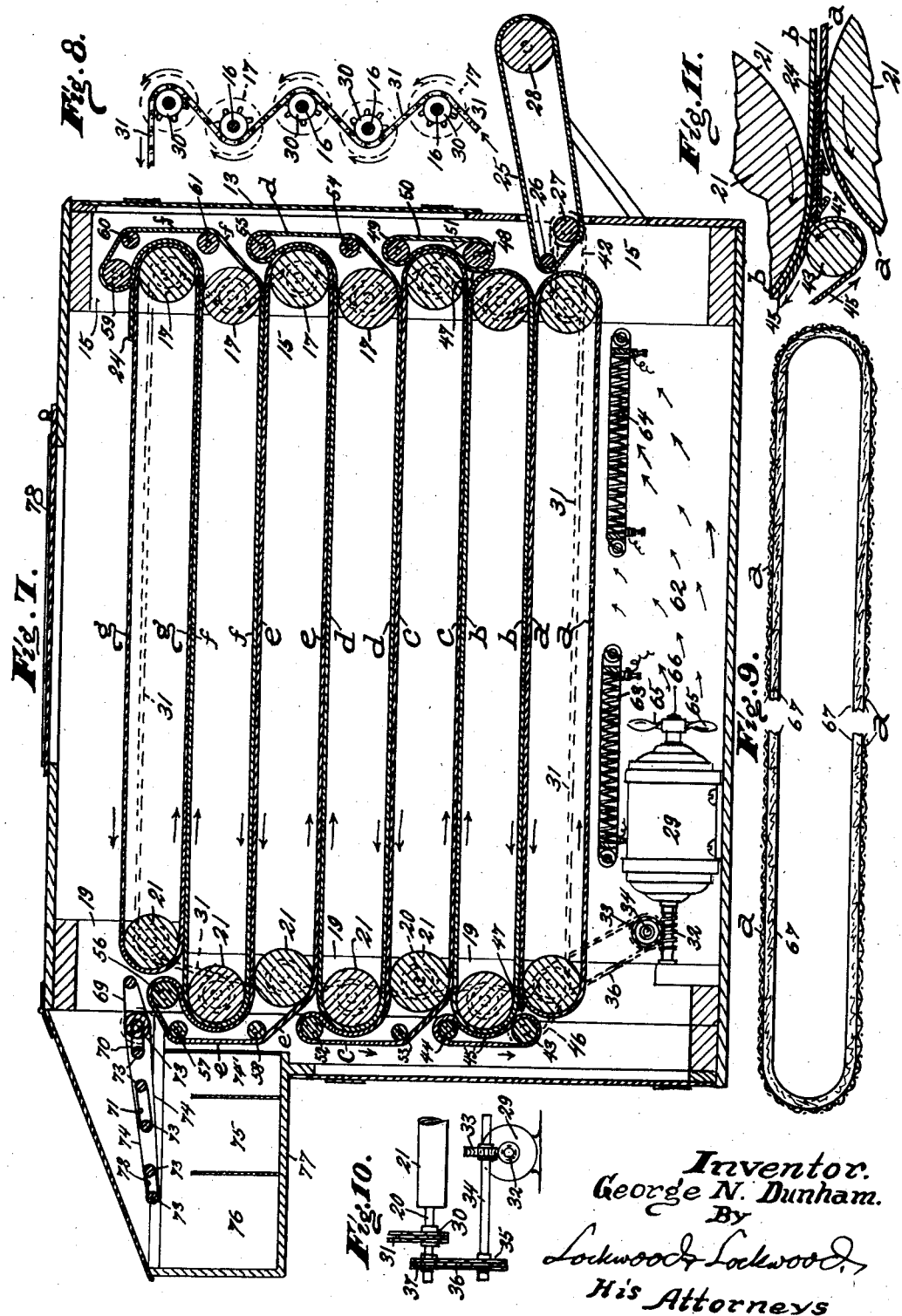

Patented July 25, 1933

1,919,275

UNITED STATES PATENT OFFICE

GEORGE N. DUNHAM, OF LOS ANGELES, CALIFORNIA

PHOTOPRINT DRIER

Application filed January 16, 1932. Serial No. 586,986.

This invention relates to an apparatus for drying paper prints and the principal object is to provide an apparatus that is especially adapted to the use of drying photographic prints and the like so as to preserve all of the features of the picture and not mar or lose their gloss in drying, and to accomplish this result with great speed and without arduous labor or loss of time. To that end I provide an apparatus with a large number of superimposed conveyors that are arranged to carry the prints through the apparatus in a progressively ascending manner and simultaneously subject the prints to a flow of dry heated air so that they are dried quickly and uniformly and this result is accomplished relatively automatically so as to save both time and labor.

As is well known the methods and means employed at the present time are unsatisfactory in the respect that they are relatively slow in production and laborious in operation and also fail to dry the prints uniformly and preserve their gloss and other features in a satisfactory manner, as in most instances the means employed are manually operated, and a further object of this invention is to provide automatic means for drying the photograph prints uniformly.

Another object of this invention is to provide automatic means for handling the prints while being dried that will function satisfactorily in the respect that the wet or damp prints are not crumpled when turned at the end of the conveyors, so that when discharged from the apparatus they are substantially smooth and straight and with unmarred edges.

A feature of the invention is shown in the means for operating the conveyors so that the photograph prints move repeatedly from end to end of the apparatus and in an ascending manner, and simultaneously subject them to an upwardly moving hot air current that uniformly removes the moisture from the prints without marring the pictures or loss of gloss of the photo-prints.

Another feature of invention is shown in the means for supporting the conveyors and automatically turning the photograph prints from one conveyor to another.

Another feature of invention is shown in the construction of the conveyors and conveyor rollers whereby the edges of the conveyors are reinforced with the reinforcements traveling through guides at the ends of the rollers so as to transversely hold the conveyors taut.

Other objects, advantages and features of invention may appear from the accompanying drawings, the subjoined detailed description and the appended claims.

The accompanying drawings illustrate the invention, in which:

Fig. 1 is a side view of an apparatus for drying photograph prints that is constructed in accordance with this invention, parts indicated diagrammatically. Fig. 2 is an enlarged fragmental section on line 2—2, Fig. 1. Fig. 3 is an enlarged fragmental sectional view through the upper rollers showing the means for automatically transferring the photo-prints from one conveyor to another by the arrangement of the conveyors. Fig. 4 is a cross section on line 4—4, Fig. 2, showing the adjustable and resilient mounting of the rollers at one end of the conveyors. Fig. 5 is a fragmental section on line 5—5, Fig. 4. Fig. 6 is a fragmental view of one of the roller supporting posts showing a preferred means for mounting the rollers at the other or rear ends of the conveyors. Fig. 7 is an enlarged central longitudinal section through the apparatus with parts indicated semi-diagrammatically and the conveyors exaggerated as to thickness. Fig. 8 is a fragmental view showing part of the sprocket wheels and chain for moving the rollers in time with one another. Fig. 9 is a longitudinal section through one of the conveyors detached from its rollers showing semi-diagrammatically the construction of the conveyor, exaggerated as to thickness. Fig. 10 is a diagrammatic view showing the driving connection between a motor and the drying conveyors. Fig. 11 is a fragmental semi-diagrammatic sectional view through one set of the lower conveyors showing another means for turning the wet photoprint from one set of conveyors to another.

The apparatus includes a housing 10 that can be made of any suitable material and at one side it is provided with the glass windows 11 and 12 that are arranged to slide by one another as indicated by dotted lines in Fig. 1 so the interior is accessible and also visible from one side. Also the housing is preferably provided with end doors 13 and 14 for the purpose of making the interior of the apparatus additionally accessible.

The interior of the apparatus is provided with front posts 15 on which the spindle 16 of the forward rollers 17 are preferably mounted on the adjustable and resilient bearings 18, as best shown in Figs. 4 and 5, and in the rear end of the apparatus are posts 19 for supporting the spindles 20 of the rear rollers 21, as best shown in Figs. 6 and 7.

The bearings 18 at the front end of the apparatus are adjustable so that a proper tension can be applied to the respective conveyors $a$, $b$, $c$, $d$, $e$, $f$ and $g$, and they yield vertically to compensate for the photograph prints that pass between the conveyors, which prints may vary in thickness. It is understood, however, that the tension of the springs 22 of these bearings is sufficient to squeeze the water or moisture out of the prints when passing between the front rollers.

The conveyors in a manner operate as pairs. That is, $a$ and $b$ first operate as a pair to carry the photo-prints from the front to the rear of the drier and then conveyor $b$ is paired with conveyor $c$ to reverse the direction of travel of the prints, and then $c$ acts with $d$ and $d$ with $e$, and so on until the photo-prints are discharged on to the top surface of the conveyor $g$.

The curved slots 23 in which the spindles 20 of the rear rollers are mounted permit the upper roller of a pair to move upward when the prints are passing between them. However, these rollers are quite heavy and they aid considerably in squeezing the water or moisture out of the prints.

The photo-prints 24 shown in section in Figs. 3 and 11 are fed into the apparatus by an endless conveyor 25 that extends over the rollers 26, 27 and 28, as best shown in Fig. 7. The photo-prints 24 are placed on the top of the conveyor 25 either by hand or any suitable means and carried downwardly into the apparatus between the endless conveyors $a$ and $b$ that are driven by the motor 29, as will now be explained.

All of the spindles 16 and 20 are extended through the closed side of the housing 10 and are provided with sprocket wheels 30 over which an endless chain 31 is extended, as shown by full and dotted lines in Figs. 7, 8 and 10.

The motor 29 has a worm 32 engaging a worm gear 33 on one end of the cross shaft 34 that also has a sprocket 35 on its other end that is connected by an endless chain 36 with a sprocket wheel 37 on the extended end of the lower spindle 20 so that when the motor is driven it will drive the chain 31 to rotate all of the rollers 17 and 21. The chain 31 is arranged on the sprocket wheels 30 so the conveyors are moved in a proper order and time with one another.

A feed conveyor 25 as stated, is mounted at the front of the apparatus on the rollers 20, 27 and 28, and a driving connection between the roller 27 and lower spindle 17 is diagrammatically indicated by the dotted chain 42 shown in Fig. 7. Such driving connections are old and, therefore, are not shown in detail.

Also in driving connection with the lower spindle 20 are two rollers 43 and 44 that carry a conveyor 45 that aid in turning the photo-print 24 from between the conveyors $a$ and $b$ to the conveyors $b$ and $c$.

These rollers are driven by a chain 46 shown by dotted lines at the rear end of the apparatus, as indicated at the left side of Fig. 7.

Also as best shown in Fig. 7, I provide a photo-print stripper 47 that is arranged between the rollers 21 and 43 or more properly between the near converging point of the conveyors $a$, $b$ and 45 that aids the conveyor 45 in turning the photo-prints upward and in between the conveyors $b$ and $c$ and preferably the stripper 47 is formed of zinc so the wet or damp photo-prints will not stick in passing over it.

Also at the front end of the apparatus are two rollers 48 and 49 that carry a conveyor 50 that aids in turning the photo-prints from between the conveyors $b$ and $c$ to the conveyors $c$ and $d$, and a chain 51 shown by dotted lines is in driving connection with the spindle 16 that supports the rollers 17 at the front end of the conveyor $c$. I also provide a zinc stripper 47 between the conveyors $b$—$c$ and 50, as diagrammatically shown at the right side of Fig. 7.

At the rear end of the apparatus the conveyor $c$ is extended over two idle rollers 52 and 53 that are arranged so the photo-prints 24 after passing rearwardly between the conveyors $c$ and $d$ are turned upwardly in an arc and directed in between the conveyors $d$ and $e$.

At the front end of the conveyor $d$ are two idle rollers 54 and 55 over which it is extended and arranged so that after the photo-prints 24 reach the forward end of the conveyor $d$ it turns the photo-prints in an upward arc and feeds them in between the conveyors $e$ and $f$.

At the rear end of the conveyor $e$ there are three idle rollers 56, 57 and 58 over which it is extended and arranged so that the photo-prints 24 after traveling rearwardly and horizontally are then moved in an upward arc and then turned horizontally so they move in a reverse direction between the conveyors *f* and *g*.

The roller 56 is arranged directly above the next to the top roller 21 so that it irons the photo-prints downward into a straight horizontal course, as best shown at the left hand of Fig. 3.

The front end of the conveyor *f* is extended over the three idle rollers 59, 60 and 61 to enclose the forward end of the conveyor *g* so that the photo-prints 24 at the end of the horizontal forward travel between the conveyors *f* and *g* are moved in an upward arc and then turned horizontally in a reverse direction on the top of the conveyor *g*. The roller 59 is arranged directly above the top roller 17 so that it irons the photo-prints 24 down into a substantially horizontal course as best shown at the right of Fig. 3.

Below the conveyor *a* is a compartment 62 in which two electrical heaters 63 and 64 are arranged so that the fan 65 on the motor shaft 66 will drive the heated air upwardly through the conveyors to dry the photo-prints as they are moved repeatedly from end to end and upward in the apparatus as described.

The conveyors are preferably formed of relatively strong cloth or fabric through which the heated air can pass readily and these conveyors each have their edges reinforced with a relatively thick endless fiber ribbon 67 that in addition to strengthening the conveyors are arranged to travel in annular recessed guides 68 at the ends of the rollers 17 and 21 as best shown in Figs. 2 and 9 and this arrangement of the conveyors on the rollers holds them taut transversely.

After the prints 24 have passed through the apparatus they discharge from the rear end of the conveyor *g* on to a short conveyor 69 that delivers the prints to the distributor conveyors 70, 71 and 72 that are mounted on rollers 73 that are driven by a chain 74 diagrammatically shown as in driving connection with the top spindle 20 and rollers 73.

The distributing conveyors are arranged to separate the prints when dried and drop them in the compartment 74′, 75 and 76 in the extension 77 that is an integral part of the apparatus. Their purpose is to drop the short photo-prints into the compartment 74, the long photo-prints into the compartment 76 and the photo-prints of intermediate length into the compartment 75.

I provide the apparatus with a top slide door 78 that can be opened to permit a flow of air from the compartment 62 upward through the conveyors as described, and also the apparatus is provided with a thermometer 79, as indicated by dotted lines in Fig. 1.

In operation the damp or wet photo-prints are placed on the conveyor 25 which is driven as described to feed the photo-prints in between the conveyors *a* and *b*, the rollers 17 being mounted, as stated, to squeeze the moisture out of the prints as they pass between them, and also the rollers 56 and 59 are arranged to iron out the photo-prints so they are smooth and straight when they are dried and ready to discharge from the apparatus. While passing through the apparatus the photo-prints are subjected to a flow of hot air as described, and progressively pass between all the pairs of conveyors from *a* and *b* to *f* and *g* and at the ends of the pairs of conveyors are turned in upwardly extending arcs as described.

What I claim as my invention is:

1. A photo-print drier including sets of superimposed conveyors arranged to carry the photo-prints between them, and an endless belt arranged adjacent the discharge end of said conveyors for transferring the photo-prints to an adjacent upper set of conveyors.

2. A photo-print drier including sets of superimposed conveyors arranged to carry photo-prints between them, and idle rollers arranged to extend the lower conveyor of each set to a position above the conveyor of its respective set to automatically turn the photo-prints in upwardly extending arcs to transfer them to an adjacent upper set of conveyors.

3. A photo-print drier including sets of superimposed conveyors arranged to carry photo-prints between them, and also arranged so that the upper conveyor of the lower set in turn becomes the lower conveyor of an adjacent upper set; means for turning the photo-prints in upward arcs from one set of conveyors to another as they are progressively moved through said drier, and means whereby the lower conveyor of the uppermost set overlies an end portion of the upper conveyor to iron out the prints as they are delivered to the upper surface of the top conveyor.

4. A photo-print drier including a plurality of superimposed conveyors extending longitudinally through the drier and arranged to coact in sets to carry photo-prints between them, endless belts arranged vertically adjacent the ends of two of said conveyors that are actuated to move the photo-prints in upward arcs to transfer them from one set of said superimposed conveyors to another, and a photo-print stripper arranged adjacent the discharge end of the lowest positioned conveyor to aid the vertically arranged endless belt in transferring the photo-prints from the lower to its adjacent upper conveyor.

GEORGE N. DUNHAM.